(12) United States Patent
Tan et al.

(10) Patent No.: US 9,799,198 B2
(45) Date of Patent: Oct. 24, 2017

(54) SYSTEM AND METHOD FOR COMMUNICATING WITH AN OPERATOR OF THE SYSTEM

(71) Applicant: General Electric Company, Schenectady, NY (US)

(72) Inventors: Huan Tan, Niskayuna, NY (US); John Michael Lizzi, Wilton, NY (US); Douglas Forman, Niskayuna, NY (US); Charles Burton Theurer, Alplaus, NY (US); Omar Al Assad, Niskayuna, NY (US); Romano Patrick, Atlanta, GA (US); Viktor Holovashchenko, Niskayuna, NY (US); Balajee Kannan, Niskayuna, NY (US); Yonatan Gefen, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 15/058,368

(22) Filed: Mar. 2, 2016

(65) Prior Publication Data
US 2017/0178485 A1    Jun. 22, 2017

Related U.S. Application Data

(60) Provisional application No. 62/269,523, filed on Dec. 15, 2015, provisional application No. 62/269,425, (Continued)

(51) Int. Cl.
*G08B 21/00* (2006.01)
*G08B 21/18* (2006.01)
(Continued)

(52) U.S. Cl.
CPC ............. *G08B 21/18* (2013.01); *G05B 15/02* (2013.01); *G05B 19/048* (2013.01); *G08B 7/06* (2013.01); *G05B 2219/14006* (2013.01)

(58) Field of Classification Search
CPC .................................. B25J 9/16; G08B 21/18
(Continued)

(56) References Cited

U.S. PATENT DOCUMENTS 7,668,621 B2 * 2/2010 Bruemmer ............... 318/568.12
7,966,093 B2 6/2011 Zhuk
(Continued)

OTHER PUBLICATIONS

Kazeroon H. et al.; Force Augmentation in Human-Robot Interaction; American Control Conference; May 23-25, 1991; pp. 2821-2826.

(Continued)

*Primary Examiner* — Phung Nguyen
(74) *Attorney, Agent, or Firm* — John P. Darling

(57) ABSTRACT

Method includes executing a dynamic decision-making process that includes (a) receiving environmental data and (b) determining a fused ensemble based on the environmental data and a state parameters of a current state of a machine assembly. The fused ensemble includes communications from a system interface to the operator for the state parameters. The communications inform an operator about the state parameters and includes at least one of a visual signal, an audible signal, or a tactile signal from the system interface. The decision-making process also includes (c) communicating the fused ensemble to the operator through the system interface and (d) repeating (a)-(c) while the machine assembly is in the current state. The fused ensemble is configured to change based on changes in the environmental data.

19 Claims, 7 Drawing Sheets

Related U.S. Application Data filed on Dec. 18, 2015, provisional application No. 62/269,337, filed on Dec. 18, 2015, provisional application No. 62/269,481, filed on Dec. 18, 2015.

(51) Int. Cl.
*G05B 15/02* (2006.01)
*G05B 19/048* (2006.01)
*G08B 7/06* (2006.01)

(58) Field of Classification Search
USPC ............ 340/679, 686.5, 691.6, 407.1, 815.4, 340/384.1; 700/248, 258
See application file for complete search history.

(56) References Cited

U.S. PATENT DOCUMENTS

| | | | |
|---|---|---|---|
| 8,583,313 B2 * | 11/2013 | Mian | G05D 1/0229 700/245 |
| 8,781,629 B2 | 7/2014 | Ota | |
| 8,845,266 B1 | 9/2014 | Ward et al. | |
| 9,085,080 B2 | 7/2015 | Mian | |
| 9,092,698 B2 | 7/2015 | Buehler et al. | |
| 2014/0163730 A1 * | 6/2014 | Mian | B25J 9/16 700/248 |
| 2014/0371911 A1 * | 12/2014 | Mian | B25J 9/1697 700/259 |

OTHER PUBLICATIONS

Kim et al.; Smart Wearable Robot Glasses for Human Visual Augmentation Based on Human Intention and Scene Understanding; 2010; School of Electrical Engineering and Computer Science, Kyungpook National University; 5 pages.

* cited by examiner

SYSTEM AND METHOD FOR COMMUNICATING WITH AN OPERATOR OF THE SYSTEM

CROSS-REFERENCE TO RELATED APPLICATIONS

This application claims priority to U.S. Provisional Application Nos. 62/269,523; 62/269,425; 62/269,377; and 62/269,481, all of which were filed on 18 Dec. 2015, and the entire disclosures of which are incorporated herein by reference.

FIELD

The subject matter described herein relates to automated systems and automated systems that are configured to communicate with humans or other systems.

BACKGROUND

Automated systems, such as robotic systems, are used in a variety of industries to reduce labor costs and/or increase productivity. An automated system may include a plurality of interconnected parts that are configured to execute one or more actions for performing a task. For example, robotic systems in manufacturing plants may be used to assemble complex sub-assemblies of a larger system (e.g., motor). Such automated systems are typically found in controlled environments. In particular, the automated system may be stationed at a single location and configured to make the same motions without it being necessary to adapt to changing conditions.

It is desirable that systems become more autonomous and execute more complex decision-making for tasks typically performed by humans. For example, in order to disengage air brakes of a vehicle (e.g., locomotive), a human operator may pull on a lever that opens a valve of the air brakes. The valve is opened and the air within the brake system is bled (e.g., the air flows out of the brake system) to reduce the pressure within the brake system and disengage the air brakes. Use of human operators, however, is not without problems. For instance, in rail yards the operations pose safety risks to the human operators. Additionally, the use of human operators can involve increased cost relative to automated systems.

But problems with automated systems may occur as well. Although applicant is unaware of any automated system that can bleed air brakes of a vehicle, such an automated system that pulls on a brake lever to disengage a brake system may be unreliable due to the wide variances in the brake systems among several different vehicles and different states of the brake systems. For example, different vehicles may have brake levers that require different amounts of force to actuate, may have other components in locations that may be mistakenly pulled by the automated system when attempting to pull the brake lever, may have brake levers that become temporarily stuck, etc. These variances can make it difficult for an automated system to perform brake bleeding operations. Like the brake-bleeding task, other tasks (in the rail yard or other environments) exist that require a number of complex decisions that are affected by the environment. Non-limiting examples of such environments include manufacturing plants, water treatment facilities, retail stores, and grocery stores.

In order to enhance the reliability and protect the safety of the automated system and the environment, it may be desirable for the automated system to communicate with human operators (or operators that are also automated systems) as the automated system is performing a task. For example, the automated system may communicate to the operator various types of information that are associated with the current state of the system. Based on this information, operators may choose to take appropriate action to assist the automated system in accomplishing its task or to protect the automated system from damage. Conventional robot-to-human or robot-to-robot communication methods include a single standard of communication that does not change (other than the information being provided), regardless of the circumstances. For example, an automated system may include a display that is viewed by the operator. The display may present a predetermined arrangement of graphics or follow a simple set of rules. Such methods may be less effective in uncontrolled or dangerous environments.

BRIEF DESCRIPTION

In one embodiment, a method is provided that includes determining a designated task to perform using a machine assembly of a control system. The control system includes a system interface for communicating with an operator. The method also includes receiving a current state of the machine assembly while the designated task is being performed by the machine assembly. The current state is associated with a plural pre-defined state parameters. The method also includes executing a dynamic decision-making process that includes (a) receiving environmental data and (b) determining a fused ensemble based on the environmental data and the state parameters of the current state. The fused ensemble includes communications from the system interface to the operator for the state parameters. The communications inform the operator about the state parameters and includes at least one of a visual signal, an audible signal, or a tactile signal from the system interface. The decision-making process also includes (c) communicating the fused ensemble to the operator through the system interface and (d) repeating (a)-(c) while the machine assembly is in the current state. The fused ensemble is configured to change based on changes in the environmental data.

In one embodiment, a system is provided that includes a machine assembly and a control system that is configured to control the machine assembly to perform a designated task. The control system includes a system interface for communicating with an operator, wherein the control system includes one or more processors that are configured to receive a current state of the machine assembly while the designated task is being performed by the machine assembly, wherein the current state is associated with a plural pre-defined state parameters. The one or more processors are also configured to execute a dynamic decision-making process that includes (a) receiving environmental data and (b) determining a fused ensemble based on the environmental data and the state parameters of the current state. The fused ensemble includes communications from the system interface to the operator for the state parameters. The communications inform the operator about the state parameters and includes at least one of a visual signal, an audible signal, or a tactile signal from the system interface. The dynamic decision-making process also includes (c) communicating the fused ensemble to the operator through the system interface and (d) repeating (a)-(c) while the machine assembly is in the current state. The fused ensemble is configured to change based on changes in the environmental data.

In one embodiment, a method is provided that includes determining a designated task to perform using a machine assembly of a control system. The control system includes a system interface for communicating with an operator. The method also includes receiving a current state of the machine assembly while the designated task is being performed by the machine assembly. The current state is associated with a plural pre-defined state parameters. The method also includes determining a fused ensemble based on the environmental data and the state parameters of the current state. The fused ensemble includes communications from the system interface to the operator for the state parameters. The communications inform the operator about the state parameters and includes at least one of a visual signal, an audible signal, or a tactile signal from the system interface. The fused ensemble includes at least two types of signals.

In one embodiment, a system is provided that includes a machine assembly and a control system that is configured to control the machine assembly to perform a designated task. The control system includes a system interface for communicating with an operator, wherein the control system includes one or more processors that are configured to receive a current state of the machine assembly while the designated task is being performed by the machine assembly. The current state is associated with a plural pre-defined state parameters. The one or more processors are also configured to determine a fused ensemble based on the environmental data and the state parameters of the current state. The fused ensemble includes communications from the system interface to the operator for the state parameters. The communications inform the operator about the state parameters and includes at least one of a visual signal, an audible signal, or a tactile signal from the system interface. The fused ensemble includes at least two types of signals.

BRIEF DESCRIPTION OF THE DRAWINGS

The inventive subject matter described herein will be better understood from reading the following description of non-limiting embodiments, with reference to the attached drawings, wherein below.

DETAILED DESCRIPTION

Figure 1:
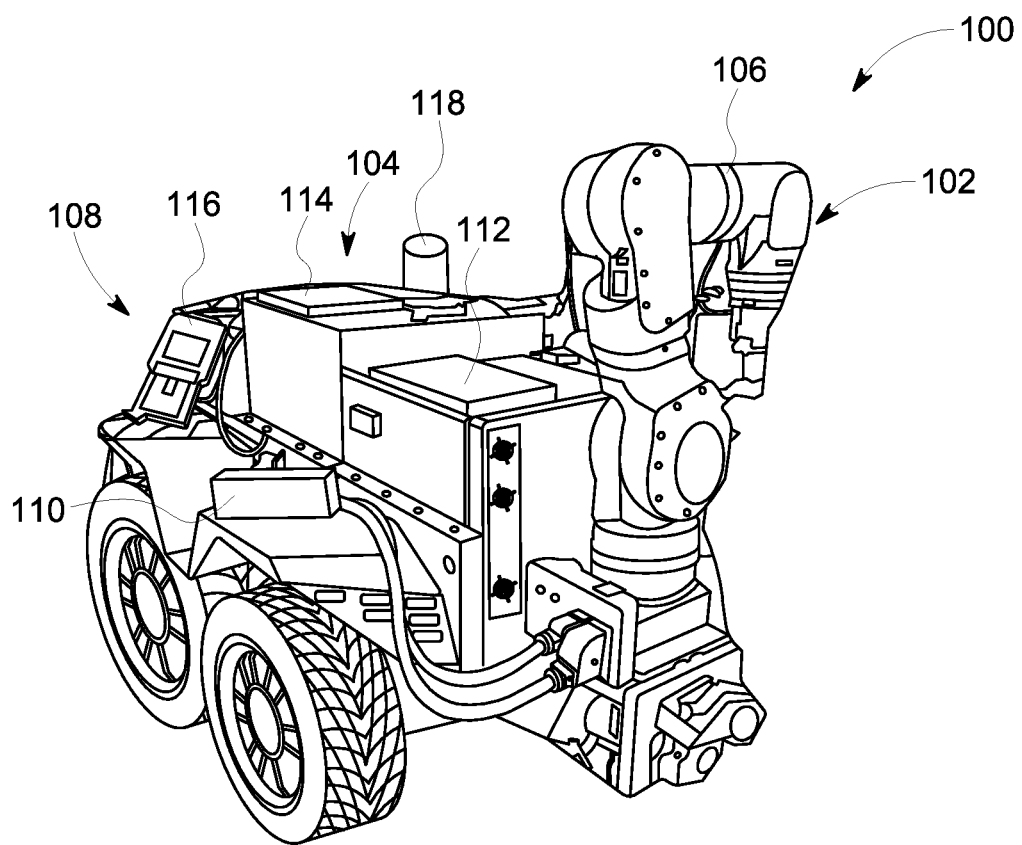
FIG. 1 illustrates a robotic control system according to one embodiment.

Reference will be made below in detail to example embodiments of the inventive subject matter, examples of which are illustrated in the accompanying drawings. Wherever possible, the same reference numerals used throughout the drawings refer to the same or like parts. Although embodiments of the inventive subject matter are described with respect to vehicles and vehicle systems such as trains, locomotives, and other rail vehicles, embodiments of the inventive subject matter are also applicable for use with vehicles generally, such as off-highway vehicles (e.g., vehicles that are not designed or permitted to travel on public roadways), agricultural vehicles, and/or transportation vehicles, each of which may include a brake system.

The system and methods described herein may be used to communicate information from a control system (e.g., a robotic control system) to an operator of the control system. The operator may be a human operator or another system. In some embodiments, the other system may be a supervisor system that is configured to supervise a plurality of control systems or the other system may be similarly configured or may be identical to the control system.

The information communicated to the operator from the control system may be information relating to a task that is being performed by the control system. The communication may be through a system interface that includes hardware and software for communicating the information. For example, the system interface may include a collection of different physical units, such as user displays, light sources, and audio-generating devices (e.g., speakers, horns, and the like). The information may be in the form of visual signals, audible signals, or tactile signals. Visual signals include signals that may be viewed by a human operator or visually detected by a system. The visual signals may be provided by, for example, a user display of the control system, which may be carried by the operator or carried by the control system. The user display may present different screens to the user. Visual signals may also be provided by a light source or light sources. The visual signals may literally provide the information (e.g., text that reads "train is 10 meters away") or may represent information more abstractly. For example, a green light may indicate that the environment is safe for performing a task, whereas a red light may indicate that the control system must stop performing the task. In some cases, the visual signals may include gestures performed by a robot.

Audible signals include signals that may be heard by a human operator or audibly detected by a system. The audible signals may be provided by an audio-generating device (e.g., speaker, horn, and the like). Similar to the visual signals, the audible signals may provide explicit information in a recognizable language (e.g., human or simulated voice that states "train is 10 meters away") or may provide sounds that represent information more abstractly. For example, an arrangement of beeps may indicate that the task is complete. A series of beeps may indicate that an object is approaching. Different beeps may have at least one of a different audible frequency, tone, or volume. Tactile signals are signals that may be touched by a human operator or sensed by a system. The tactile signals may include, for example, vibrations or predetermined movements of a mechanical component.

Embodiments described herein may be configured to provide a fused ensemble of different communications to the operator. As used herein, a "fused ensemble" includes a plurality of different communications that may be provided to an operator. Each communication conveys different information. The fused ensemble may be provided by a single device (e.g., user display) or provided by multiple devices (e.g., user display and speaker). Accordingly, a fused ensemble may include plural different types of communications (e.g., audio, visual, tactile). The plural communications of a fused ensemble may be provided simultaneously, concurrently, within a limited time period from each other (e.g., less than ten seconds), or during the same time period in which the control system has a designated operative state. The fused ensemble may be dynamic and can change while the machine is in an operative state. The change may be based on environmental data received by the control system.

As used herein, "environmental data" includes information relating to the operating environment of the control system. The environmental data may include weather conditions (e.g., temperature, humidity, whether it is raining, snowing, or sleeting, etc.). The environmental data may include visibility information. For example, if it is foggy, snowing, or raining, the visibility may be reduced. If several objects are located within a designated area, visibility may be poor because line-of-sight is reduced. The environmental data may include position data and motion data of the other objects within the area. For example, the position data may identify a location of an object within the area. Motion data may identify a speed and direction of another object in the area. Environmental data may also be task-specific. For example, if the task is brake-bleeding, the environmental data may relate to the forces experienced by a robotic arm of the control system.

Environmental data may be detected by the control system or received by other systems. The control system may include one or more sensors, such as inertial sensors, thermal sensors, tactile sensors, compasses, range sensors, sonar, imaging devices, lasers for object detection and range sensing, imaging devices, and the like. The control system may also include Global Positioning System (GPS). Imaging devices may be any suitable device for capturing images, such as, for example, an infrared imager, a video camera, a still camera, a digital camera, a Complementary Metal Oxide Semiconductor (CMOS) imaging device, a charge coupled device (CCD) imager, and the like.

Other data may also be considered by embodiments set forth herein. For example, the control system may store data relating to industry regulations, governmental regulations (e.g., safety regulations), or industry practices. Other data may include preference data. The preference data may include data relating to an operator's preference. For example, the operator may prefer to hear a voice over a beeping noise.

As used herein, a "designated task" includes a task that will require at least some mechanical movement of the control system. One exemplary task includes brake bleeding in which a robotic arm moves a lever. The designated task may include plural sub-operations that are executed to complete the task. For example, the brake-bleeding task may include moving the robotic arm toward a lever, positioning an end of the robotic arm against the lever, registering a force that is necessary to move the lever, and moving the lever.

As the control system performs the designated task, the control system may have various operating states. An operating state may include a configuration of the control system (e.g., robotic arm). The configuration may include an orientation of one or more components in three-dimensional space. Optionally, the configuration may also include a state of a motor or actuator. As one example, an operating state of a robotic arm may include holding a designated number arm elements at fixed positions with respect to one another and rotating the arm at a designated speed.

Each operating state may be associated with plural state parameters. For example, the state parameters may include a speed of the control system, a speed at which nearby systems are moving, and a distance between the control system and a target object. Each of these state parameters may be conveyed to the operator through a respective communication. For example, the speed of the control system or nearby systems may be provided on the user display in kilometers/hour, miles/hour, or other rate. Different tasks, operating states, and state parameters may be described in U.S. Provisional Application Nos. 62/269,523; 62/269,425; 62/269,377; and 62/269,481, each of which is incorporated herein by reference in its entirety.

The distance between the control system and a target object may be provided on the user display in meters, feet, or other units. Alternatively or in addition to the user display, the distance may be represented by an audible signal. For example, a speaker may provide a series of beeps. The frequency at which the beeps occur (as opposed to audible frequency) may be based on the distance between the control system and the target object. For instance, as the control system becomes closer to the target object, the frequency of beeps may become greater (e.g., the beeps become less spaced apart). Alternatively or in addition to the user display and/or the audible signal, the distance may be represented by a light source or a combination of light sources. For instance, as the control system becomes closer to the target object, a frequency at which a single light source flashes may become greater. Alternatively, a color of a single light source (or multiple light sources) may change (e.g., from green to yellow to red) as the control system approaches the target object. Alternatively or in addition to the user display, the audible signal, and/or the visual signal, the distance may be represented by a tactile signal. For example, a device held by the operator (e.g., joystick or hand rail) may vibrate when the control system is within a designated distance from the target object.

Environments that may be particularly suitable for embodiments set forth herein include environments that have constrained work spaces, loud noises, unstructured or dynamic conditions, dangerous conditions for humans, and/or high payloads. Environments may also be regulated for safety or to satisfy government or industry standards. One such environment includes rail yards in which it may be necessary to manipulate high payloads within constrained working spaces and conditions that frequently change. Other environments may include manufacturing plants, water treatment facilities, retail stores, grocery stores, and the like.

In particular embodiments, the systems and methods described herein may be used to perform a brake-bleeding task, such as the brake-bleeding tasks described in U.S. Provisional Application Nos. 62/269,523; 62/269,425; 62/269,377; and 62/269,481, the entire disclosures of which are incorporated herein by reference. For example, the systems and methods described herein can be used to validate a brake release action using feedback from one or more sensors. These sensors can include, but are not limited to a force and/or torque sensor installed on a robotic arm that moves a brake lever, position feedback of the robotic arm (e.g., encoders that sense displacement of the arm and/or lever), and/or acoustic measurement of the air release using one or more microphones. A computer, such as a controller, reads the sensor inputs and provides the following outputs based on the inputs: whether the brake is released (and, optionally, a confidence value or index indicative of a probability that the brake was released) and/or whether the brake was not released and (and, optionally, a confidence value or index indicative of a probability that the brake was not released). The action of pulling or pushing the brake lever can provide a direct feedback measured as an amount of lever (or rod) displacement and/or an amount of force and torque applied on the lever in several or all directions. The action of pulling or pushing the brake lever can provide an indirect feedback measured as acoustic sound of the air released via a brake valve.

The act of bleeding a brake system can be associated with a priori predicted values of these feedbacks. For example, the sensor feedback can be monitored while attempting to bleed the brake systems of a large sample of vehicles. Based on the sensor feedbacks from this sample and whether the brake systems were or were not released, the probabilities of whether a brake system on other vehicles is or is not released can be determined. For example, the measured difference between the sensor feedbacks from the sample and from a current brake system can be used to validate the brake release and provide the confidence interval (e.g., the confidence value or index). The use of the confidence value or index is used to provide an accurate estimation or validation of whether the brake system was bled. Because there are no known sensors on rail cars to indicate whether an air brake has been released, the systems and methods described herein meet a need by determining whether the air brake is released.

The act of bleeding a brake system, also referred to herein as brake bleeding, using an automated system may risk substantial detection errors for the automated system to locate and then actuate the target object, which may be a brake lever. For example, there may be perception errors in locating the brake lever in the working environment in addition to control errors occurring as the automated system moves towards the perceived location of the brake lever. If the error is too large, the automated system may miss the brake lever or may engage the brake lever at a wrong location or orientation that does not properly actuate the brake lever, resulting in insufficient bleeding of the brake system. Furthermore, the automated system may have to make several attempts to locate, engage, and actuate a single brake lever before the air is released from the brake system, which can consume a significant amount of time and resources The systems and methods described herein can be used to actuate a brake release action. During this time, one or more fused ensembles may be communicated to the operator. An automated system implements closed loop control of a robotic arm to locate and actuate a brake lever to bleed a brake system. For example, even with a perception error that is relatively large, such as 2-5 cm, the error decreases as the robotic arm approaches the brake lever due to closed loop feedback from one or more sensors. The sensors can include, but are not limited to, an imaging sensor installed on the robotic arm that moves the brake lever, a force and/or torque sensor installed on the robotic arm, and/or position feedback of the robotic arm (e.g., encoders that sense displacement of the arm). A computer, such as a controller, reads the sensor inputs and provides the following outputs based on the inputs: the location of the brake lever, the current position and movement of the robotic arm, and/or the forces and/or torques applied by the robotic arm (as the arm moves and actuates the brake lever). The sensors provide the outputs to the computer as the robotic arm moves, and updated information is used to revise or adjust the movement of the robotic arm towards the brake lever, reducing the error between the perceived position of the brake lever relative to the position of the robotic arm. Thus, the systems and methods described herein control the robotic arm to increase the efficiency of the brake bleeding task by reducing first attempt failures to bleed the brake system without compromising speed.

The processing speed of perception information acquired by the imaging sensor may be relatively slow, such as around 0.2 Hz. In order to synchronize the perception aspect of the system with the control aspect of the system which conveys control signals to the robotic arm, one or more embodiments described herein implement a step-wise visual servo control algorithm during the brake bleeding task. For example, a motion prediction model may be used to estimate the position of the brake lever relative to the robotic arm as the robotic arm moves towards the brake lever. The motion prediction model provides feedback for closed loop control of the robotic arm. But, since the frequency of the perception is slow, the feedback information may not be available as often as required for the motion prediction model alone to be used to accurately guide the robotic arm. At this time, one or more fused ensembles may be communicated to the operator.

In one or more embodiments, an optical-flow prediction model is used as an additional environmental information source for estimating the relative position and movement between the robotic arm and the brake lever. The estimation provided by the optical-flow prediction model increases the frequency of perception and synchronizes the perception aspect of the system with the control aspect because the estimated variables of location and/or position may be used in control calculations when the slower, but more accurate, perception information is not available. Optionally, one or more fused ensembles may be communicated to the operator that are based on the optical-flow prediction model.

The systems and methods described herein may include a grasping control system, such as an automated system (e.g., a robot) for grasping a break lever. The automated system may use feedback from one or more sensors to position a manipulator and an end-effector to grasp the break lever. These sensors may include, but are not limited to a force and/or torque sensor installed on an end-effector of the manipulator, position feedback sensors on the robotic arm (e.g., encoders that sense displacement of an arm and/or lever), a peripheral sensor, and/or the like. A computer, such as a controller, reads the sensor inputs and adjusts a position and/or orientation of the end-effector based on the sensor inputs. The controller may continually adjust in real-time the position and/or orientation of the end-effector to enable the automated system to firmly grasp the brake lever. At this time, one or more fused ensembles may be communicated to the operator.

Thereby, a technical effect of the various embodiments described herein provide for real-time planning and adjusting a position and/or orientation of the end-effector. Based on the sensor inputs the controller may generate a plurality of closed loops to control movement and/or drive the manipulator and the end-effector. The sensor inputs may be utilized by the controller as feedback information relating to the automated system and the environment (e.g., area surrounding the automated system, task space) to adjust the manipulator and/or the end-effector.

For example, as the end-effector is positioned approximate to and/or grasping the brake lever the controller may receive sensor inputs by the force and/or torque sensor corresponding to an amount of pressure (e.g., force, torque) applied to the end-effector while in contact with the brake lever. The controller may continually adjust a position and/or orientation of the end-effector until the controller validates or confirms the grasp based on the measured pressure is within a predetermined threshold of an appropriate grasp.

FIG. 1 illustrates a robotic control system 100 according to one embodiment. The robotic control system 100 is configured to perform one or more tasks. Each task may include a plurality of sub-operations (e.g., sub-tasks) that must be executed to complete the task. The robotic control system 100 may execute the task at least partially autonomously such that at least one of the sub-operations is performed autonomously without intervention or information from an operator. The operator may be a human operator or a robotic operator. The operator is configured to supervise the robotic control system 100 as the robotic control system 100 performs the task(s). In some embodiments, however, the robotic control system 100 may not be supervised by an operator and may perform all of the sub-operations.

In some embodiments, the robotic control system 100 is configured to perform a brake-bleeding task, such as the brake-bleeding tasks described in U.S. Provisional Application Nos. 62/269,523; 62/269,425; 62/269,377; and 62/269,481, the entire disclosures of which are incorporated herein by reference. In particular embodiments, the robotic control system 100 is configured to operate within a rail yard. The rail yard may comprise a plurality of tracks in which at least some of the tracks are located adjacent to each other. The tracks may be populated with vehicles, such as locomotives. The robotic control system 100 may be configured to bleed the brakes of the vehicles.

Although the robotic control system 100 is described herein as operating within a rail yard environment, it should be understood that the robotic control system 100 may be operated within a plurality of other environments. As one example, the robotic control system 100 may be configured to operate within a retail store. For instance, the robotic control system 100 may load merchandise onto a vehicle, un-load merchandise from a vehicle, stock shelves, identify shelves that need re-stocking, and gather items for customers. As another example, the robotic control system 100 may operate within a water treatment plant. For instance, the robotic control system 100 may gather different samples within the water treatment plant or nearby areas. Yet as another example, the robotic control system 100 may be configured to test footings along high power distribution lines. The robotic control system 100 may also be configured to operate within a manufacturing plant.

The robotic control system 100 may be particularly suitable for dynamic environments. For example, rail yards may have areas of high density in which tracks are immediately adjacent to one another and rail cars are frequently moving. Such confined spaces may be difficult to maneuver within. Rail yards can also be significantly loud such that a human or robotic control system may not be capable of hearing approaching vehicles (e.g., locomotive on adjacent track). In some cases, weather conditions may decrease visibility within the rail yard or cause other operating challenges.

The control system 100 includes a machine assembly 102 having a vehicle 104 and a robotic arm 106 that is secured to the vehicle 104. The vehicle 104 is configured to transport the robotic arm 106 to designated locations. The machine assembly 102 is configured to perform one or more tasks. It should be understood that the control system 100 may include a plurality of the robotic arms 106 or may include other types of devices that are capable of performing tasks.

The control system 100 also includes a system interface 108 that is operably coupled to the machine assembly 102 and, optionally, the vehicle 104. The system interface 108 may include a collection of communication units that are capable of communicating information to the operator in the form of audible signals, light signals, or tactile signals. For example, the system interface 108 includes a light-signaling device 110, a computing device 112, a computing device 114, and a computing device 116. In some embodiments, the computing devices 112, 114, 116 may be similar to portable computers (e.g., laptops, notebooks, tablets). In some embodiments, the computing devices may be configured to provide particular information. The system interface 108 may also include an audio-generating device 118, which may include one or more speakers, horns, and the like. The different units of the system interface 108 may operate in concert to communicate multiple pieces of information to the operator as the control system 100 is performing the task. As described herein, the methods of communicating the different pieces of information through the units may change based on environmental data.

Figure 2:
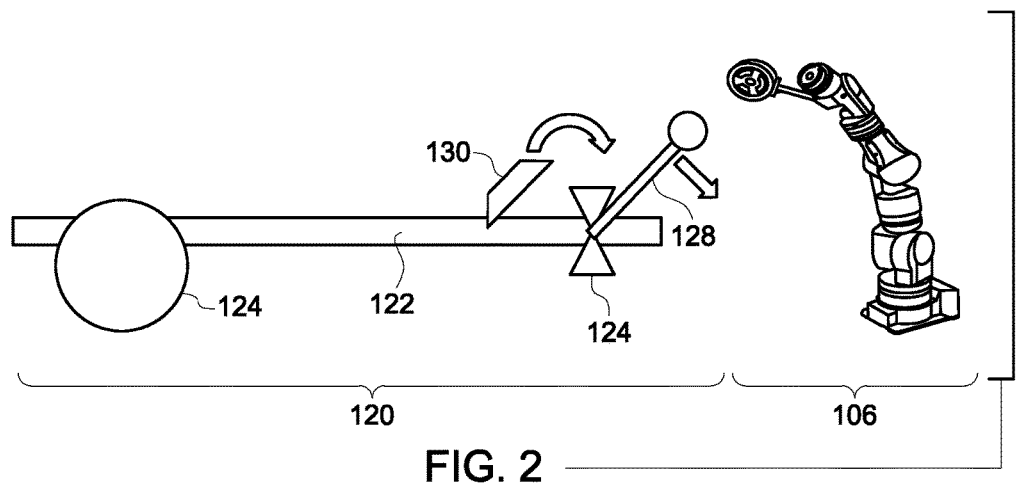
FIG. 2 schematically illustrates a brake system and a machine assembly of the robotic control system of FIG. 1 according to one embodiment.

FIG. 2 schematically illustrates a brake system 120 and the robotic arm 106 according to one embodiment. The brake system 120 may be disposed onboard one or more vehicles, such as rail vehicles, automobiles, or the like. The brake system 120 operates on a pressure differential within one or more conduits 122 of the brake system 120. When the pressure of a fluid, such as air and/or gas, in the conduits 122 is below a designated threshold or when the pressure drops by at least a designated amount, the brake system 120 engages brakes 124 (e.g., air brakes) of the brake system 120. Although only one brake 124 is shown in FIG. 2, the brake system 120 may include several brakes 124.

The conduit 122 is connected with a valve 126 that closes to retain the fluid within the conduit 122. The valve 126 can be opened to release (e.g., bleed) the fluid out of the conduit 122 and brake system 120. Once the pressure of the fluid in the conduit 122 and brake system 120 drops by or below a designated amount, the brakes 124 of the brake system 120 release. The vehicle having the brake system 120 may then freely roll with the brakes 124 being disengaged.

The valve 126 can be actuated by moving a brake lever 128. The brake lever 128 can be pulled or pushed (e.g., actuated) to open the valve 126. Releasing the brake lever 128 may cause the valve 126 to close. A latch 130 of the brake system 120 can move under the force of a spring or other device to engage the opened valve 126 and keep the valve 126 open. For example, after pulling the brake lever 128 to open the valve 126, the latch 130 may rotate or otherwise move to a position that holds the valve 126 open. The latch 130 can keep the valve 126 open and releasing fluid until the fluid drops below a designated level (e.g., a designated pressure level) that allows the brake 124 to disengage. The brake lever 128 may then be released while the valve 126 is held open by the engaged latch 130.

In accordance with one embodiment of the inventive subject matter described herein, the robotic arm 106 may engage the brake lever 128, actuate the brake lever 128, determine if the brake lever 128 has been actuated to open the valve 126, optionally determine if the latch 130 has engaged the valve 126, and/or determine that the brakes 124 have been released (e.g., the brake system 120 has been bled to release the brakes 124) based on the force or forces applied by the robotic arm 106 to move the brake lever 128, the resulting displacement (or lack thereof) of the brake lever 128, and/or sounds generated by the brake system 120. The control system 100 (FIG. 2) optionally may provide a confidence index representative of a probability that the brake system 120 has been disengaged or released based on the force, displacement, and/or sounds. The control system 100 may implement one or more follow up actions responsive to determining that the brake system 120 has or has not been disengaged, such as by communicating with one or more human operators, attempting to release the brake system 120 again, identifying the vehicle having the brake system 120 as requiring inspection, maintenance, or repair, etc.

Figure 3:
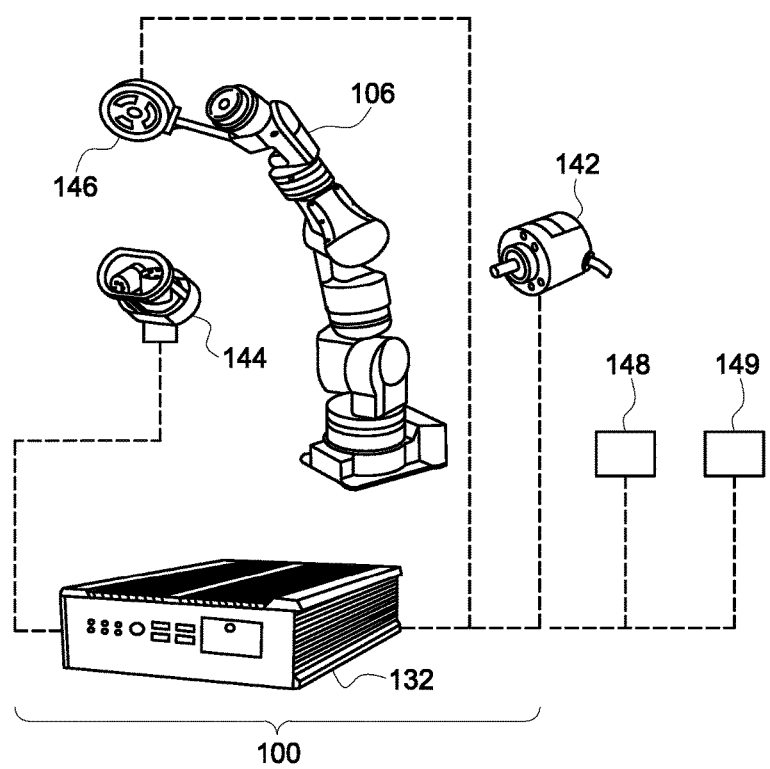
FIG. 3 illustrates a monitoring system of the robotic control system according to one embodiment.

FIG. 3 illustrates a controller 132 and a monitoring system 134 of the robotic control system 100. The controller 132 is configured to control operation of the robotic arm 106 and/or the vehicle 104. The controller 208 represents hardware circuitry that includes and/or is connected with one or more processors (e.g., microprocessors, field programmable gate arrays, integrated circuits, or other electronic logic-based devices). The controller 132 may include and/or be communicatively connected with one or more memories, such as computer hard drives, computer servers, etc. The memories may include stored instructions for operating the control system 100. The controller 132 is communicatively coupled with other elements of the control system 100 through one or more wired and/or wireless connections that allow the controller 132 to dictate how and where the machine assembly 102 moves. The machine assembly 102 can include motors or other devices that are controlled by the controller 132 to move the machine assembly 102.

The monitoring system 134 includes one or more sensors 142, 144, 146 that detect operational parameters of the machine assembly 102 and/or the brake system 120. These operational parameters are communicated to the controller 132. In the illustrated example, the monitoring system 134 includes an encoder sensor 142 that converts rotary and/or linear positions of the robotic arm 106 to one or more electronic signals. The encoder sensor 142 can include one or more transducers that generate the electronic signals as the robotic arm 106 moves. The electronic signals can represent displacement or movement of the robotic arm 106, and may indicate how far the brake lever 128 (shown in FIG. 1) has been moved by the robotic arm 106.

The monitoring system 134 can include an acoustic sensor 144, such as one or more microphones. The acoustic sensor 144 may detect sounds generated during performance of one or more task (or sub-operations of the tasks). The sounds can be communicated to the controller 132 as electronic signals representative of the detected sounds. The monitoring system 134 can also include a force sensor 146 that detects forces and/or torques applied by robotic arm 106 to the brake lever 128. The force sensor 146 optionally may be referred to as a torque sensor. The force sensor 146 may communicate electronic signals to the controller 132 that represent the sensed forces and/or torques applied by the robotic arm 106. Additionally or alternatively, the force sensor 146 may include a strain gauge sensor.

Optionally, the monitoring system 134 may include one or more additional or other sensors. For example, the monitoring system 134 may include an imaging device 148. The imaging device 148 may obtain images and/or video of the brake lever 128 to determine whether the brake lever 128 has been actuated to release the brake system 120. Optionally, the force sensor 146 may estimate the force or torque based on the electric current supplied to one or more motors used to move the robotic arm. For example, larger currents may represent greater forces while smaller currents may represent smaller forces. The imaging device 148 may also obtain data for measuring a distance between the control system 100 (or the machine assembly 102) and other objects. The distance may be determined through other information, such as lasers that reflect light off the other objects and detect the reflection to determine the distance. The monitoring system 134 may include a plurality of other sensors (represented by a block 149). The other sensor(s) may be, for example, an inertial sensor, a thermal sensor, a tactile sensor, a compass, a range sensor, a sonar device, etc.

Figure 4:
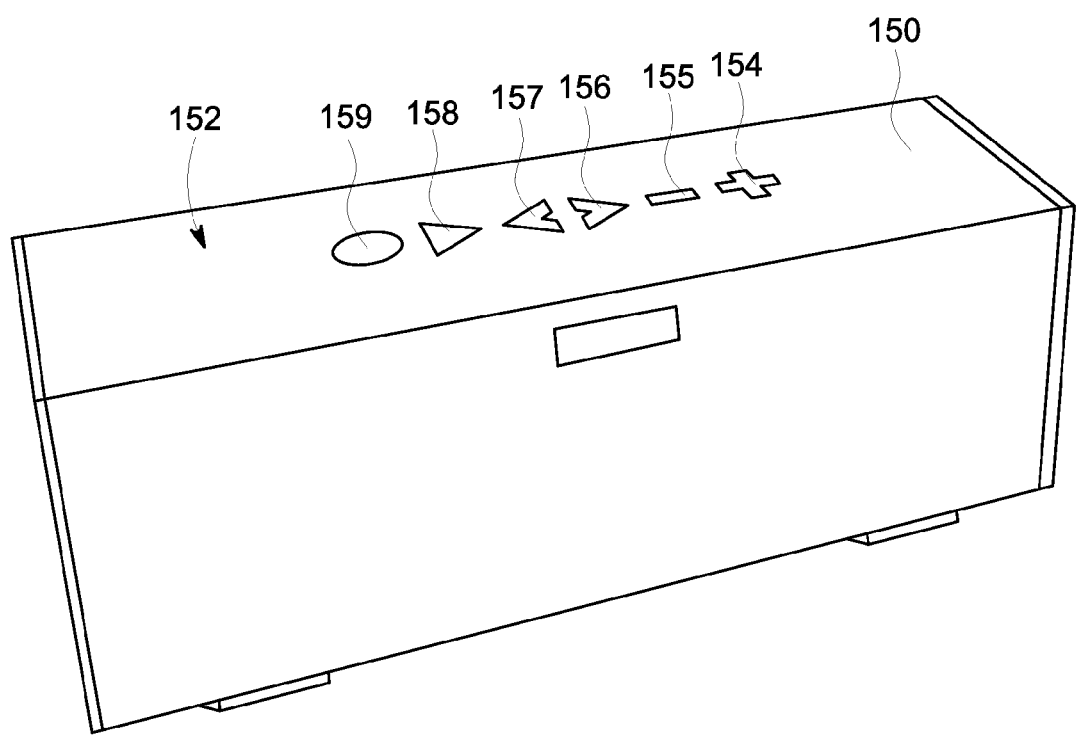
FIG. 4 is a notification device of the robotic control system of FIG. 1 according to one embodiment.

FIG. 4 is a perspective view of the light-signaling device 110 according to one embodiment. In the illustrated embodiment, the light-signaling device 110 includes a housing 150 having a housing side 152. The light-signaling device 100 also includes a plurality of light sources 154-159 positioned along the housing side 152. The light sources 154-159 may include, for example, light emitting diodes (LEDs), although other light sources are contemplated. Each of the light sources 154-159, when illuminated, may inform an operator of certain information. The lights sources 154-159 may be continuously illuminated, illuminated at a designated frequency, or illuminated in accordance with a designated schedule to convey information to the operator. For example, the light source 154 appears as a "+" sign. The light source 154 may blink at a designated frequency that is based on how close the control system 100, the vehicle 104, or the robotic arm 106 is to a target object. The target object may be, for example, a brake system or an oncoming vehicle. Accordingly, the light sources 154-159 may be illuminated to convey at least one piece of information to the operator of a current state of the machine assembly 102. Optionally, the light sources 154-159 may be illuminated to suggest operations to the operator.

Figure 5:
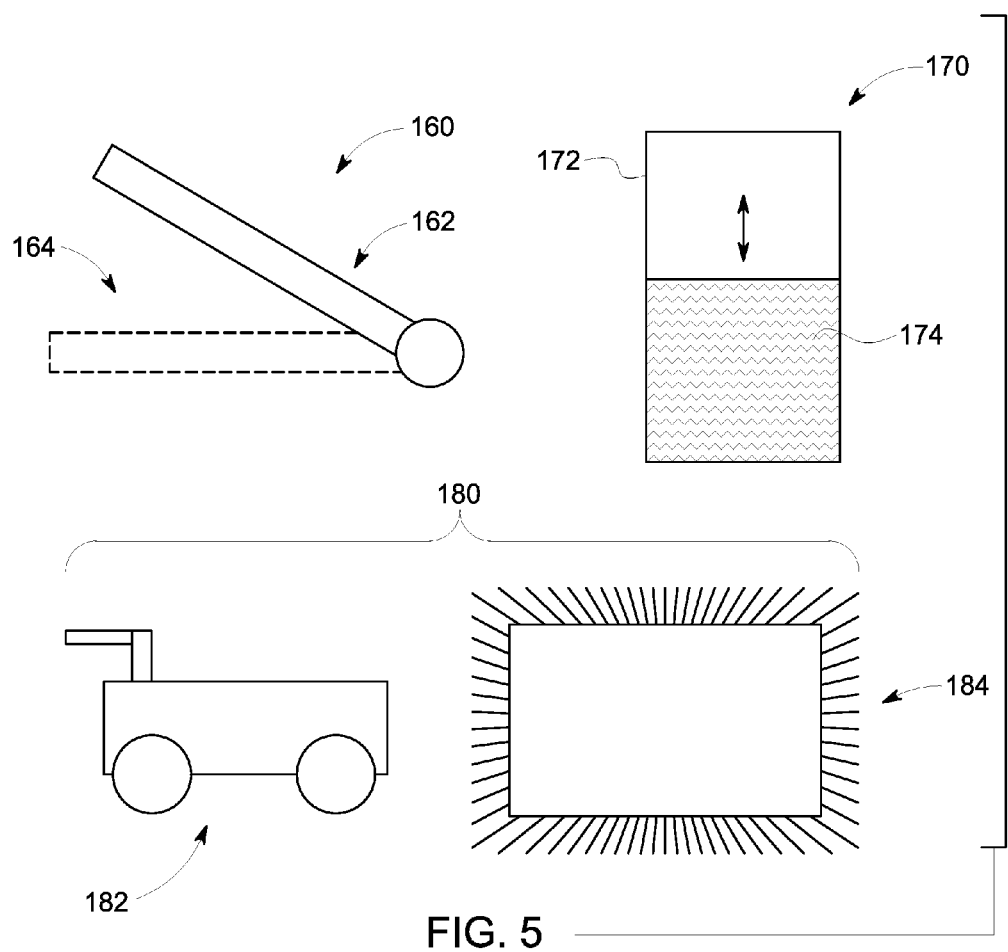
FIG. 5 illustrates various graphics that may be presented on a user display of the robotic control system of FIG. 1 according to one embodiment.

FIG. 5 illustrates various graphics that may be presented on a user display to the operator. The user display may be part of, for example, one or more of the computing devices 112, 114, 116 (FIG. 1). The user display is configured to present the different graphics to the operator in order to convey different communications. In some embodiments, the user display is a touch-sensitive display that is capable of displaying graphics and receiving user inputs. In other embodiments, the user display may only display graphics.

FIG. 5 illustrates graphical representations 160, 170, and 180. Each of the graphical representations may be configured to convey one or more pieces of information to the operator. For example, the graphical representation 160 may represent actions performed by the robotic arm 106 (FIG. 1). For example, the graphical representation 160 may be visually similar to a robotic arm or to a lever that the robotic arm engages. The graphical representation 160 may appear to indicate movement between a first position 162 (solid lines) and a second position 164 (dashed lines). Although the second position is shown in dashed lines in FIG. 5, the second position 164 may appear in solid lines, similar to the first position 162. More specifically, the first position 162 may momentarily appear and then be replaced by the second position 164. By alternating between the first and second positions 162, 164, the graphical representation 160 may give the appearance that the robotic arm or the lever is moving. The graphical representation 160 may be presented on a user display during, for example, a brake-bleeding operation in which the robotic arm is pushing or pulling a lever. The graphical representations may be stored in a database or memory.

The graphical representation 170 appears similar to a bar graph 172 having a filled region 174. As indicated by the bi-directional arrow, the filled region 174 may move vertically along the graph 172 depending upon a measurement of the state parameter that the filled region 174 may represent. For example, the fill region 174 may represent forces experienced by one or more components of the robotic arm, an energy level of a battery, a fuel level, a visibility level, and the like. As another example, the filled region 174 may represent a percentage of speed at which the control system is traveling.

The graphical representation 180 includes a system graphic 182 and an object 184. The system graphic 182 may be configured to represent the control system. For example, the system graphic 182 may appear visually similar to a vehicle having a robotic arm mounted thereon. The object 184 may be a target object that the control system is moving toward. Alternatively, the object 184 may be an unknown object that is approaching the control system. As shown, the object 184 may flash or glow to represent an alarm condition. The alarm condition may indicate that the control system is approaching the object and/or that the object is approaching the control system.

Figure 6:
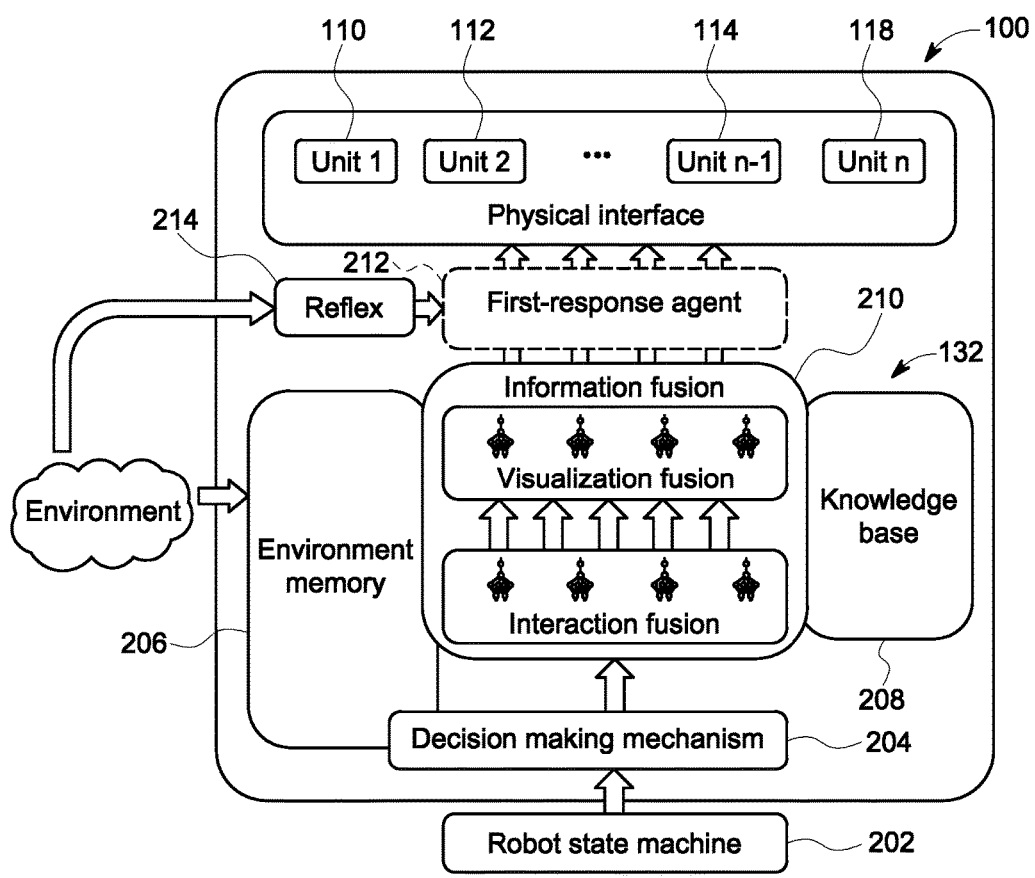
FIG. 6 illustrates a schematic diagram of an communication architecture having a plurality of modules according to one embodiment.

FIG. 6 illustrates a schematic diagram of the control system 100 according to one embodiment. As shown, the control system 100 includes the controller 132 having a collection of modules. In FIG. 6, the modules appear to be contained within a common unit. It should be understood, however, that the modules of the controller 132 may be distributed at different places of the control system 100. Optionally, one or more of the modules may be located remotely. One or more of the modules may correspond to a set of instructions (e.g., stored in memory). The instructions may be executed by one or more processors.

The controller 132 is configured to receive environmental data from one or more sensors, such as the sensors describe herein. In some embodiments, the sensors report the data to the controller 132 without prompting by the controller. In some embodiments, the controller 132 may send messages to the sensors requesting that the data be transmitted. The data may be sent continuously. For example, the data may be sent every tenth of a second, every second, every minute, and the like. The data may also be sent in accordance with a predetermined schedule. Data may also be sent when predetermined trigger events occur. For example, remote object data may be sent continuously in response to identifying that a remote object is approaching the control system.

The controller 132 may include or be configured to communicate with a robot state machine or module 202. The robot state machine 202 may determine an operating state of the control system 100 and communicate the operating state to the controller 132. The most recent operating state communicated to the controller 132 may be referred to as the current state. Data identifying the operating state may be sent continuously or only after the operating state has changed to a new state. Each operating state of the control system may correlate to predetermined states of the individual components of the control system. Each operating state may be one of a plurality of operating states that the control system may have while performing a task. In other words, each task may require the control system 100 to operate in a plurality of predetermined operating states. One or more (or all) of the operating states of the control system 100 may have one or more state parameters associated with the respective operating state.

By way of example, during a brake-bleeding task, the control system 100 may be active in one or more of the following operating states: (i) idling; (ii) searching; (iii) pre-actuation; (iv) grasping; (v) pulling; (vi) pushing; (vii) releasing; and (viii) homing. For each of the above operating states, the components of the control system may have a predetermined setting or condition. The idling state may occur when the control system is waiting for an opportunity to perform brake-bleeding of a brake system. During the idling state, the control system 100 may to receive environmental data. The vehicle 104 may be activated. The robotic arm 106 may be at a predetermined idling position. Alternatively, the robotic arm 106 may remain at a final position from a previous task or at another designated position.

The control system may be in the idling state when the control system is waiting for instructions for performing a task. During the idling state, the control system may collect environmental data and/or plan sub-operations for performing expected task. The searching state may occur after receiving instructions to perform a task. For example, the searching state may be used to gather visual information of the working area (e.g., rail yard) to identify where objects (e.g., rail cars, buildings) may be positioned with respect to the control system. The searching state may include using an imaging device. During the searching state, the state parameters may include, for example, (1) a number of objects in the working area; (2) a number of objects that are within a designated distance of the control system; (3) the objects that are obstructing a path to the desired object (e.g., rail car for brake-bleeding). During the searching state, the control system may receive acoustic information. The acoustic information may be used to identify the type of objects that are nearby. For example, the acoustic information may be used to identify or confirm that an object is approaching the control system.

During either of the idling state or the searching state, the control system may plan a protocol of sub-operations for performing the assigned tasks or other tasks that have not yet been assigned. During the idling state and/or the searching state, the control system may communicate with other control systems in the working area. The other control systems may provide useful data to the control system-of-interest. For example, the other control systems may facilitate identifying the locations of objects in the working area.

The pre-actuation state may occur as the robotic arm moves closer to a designated position for manipulating the target object. The pre-actuation state may include one or more sub-operations that prepare the control system for performing the designated task. In this example, the robotic arm is prepared (e.g., positioned) relative to a lever for grasping and moving the lever. In some embodiments, the vehicle may be in a stationary position during the pre-actuation state.

Figure 7:
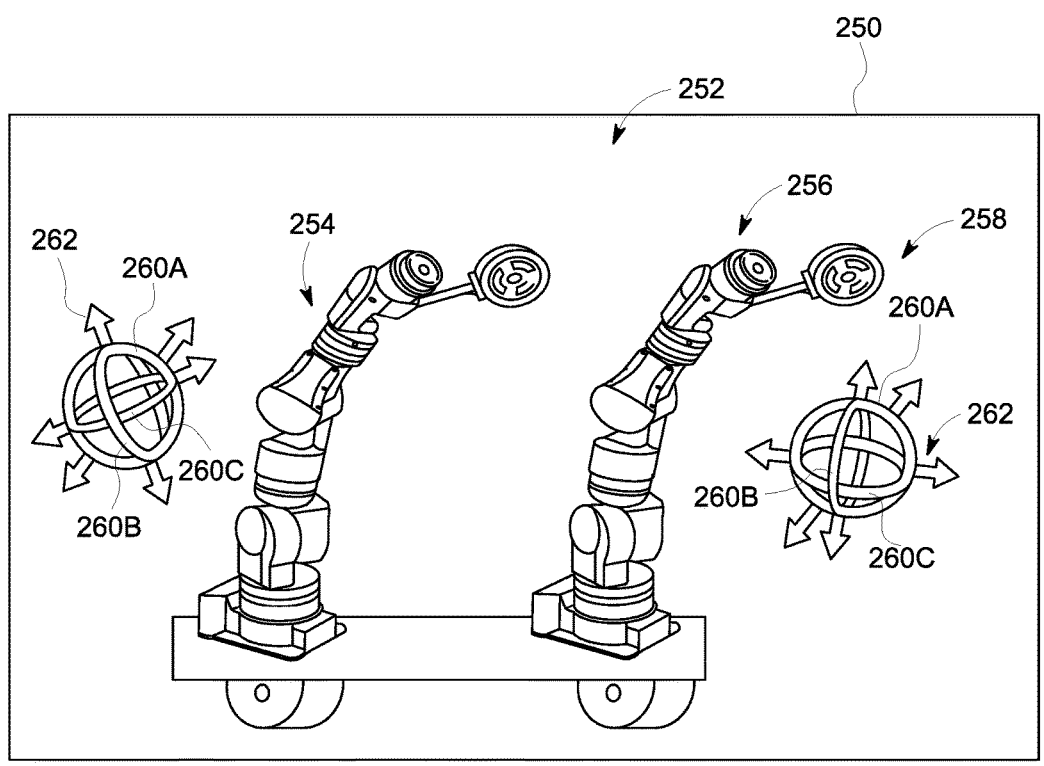
FIG. 7 illustrates a screen that may be presented to an operator according to one embodiment.

During the grasping state, the control system may move the robotic arm to engage the target object (e.g., lever). The control system may communicate to the user various information. For example, FIG. 7 illustrates a screen 250 that may be presented to the operator on a user display. In the illustrated embodiment, the screen 250 includes a graphical representation of a control system (indicated at 252), which includes graphical representations of a first robotic arm 254 and a second robotic arm 256. The graphical representations also include two vector representations 258, 259. Each vector representation 258, 259 includes three intersecting circles 260A, 260B, 260C and vector arrows 262. Six (6) vector arrows 262 are shown for each vector representation. The vector representations 258, 259 may be used to inform the operator of vector parameters. More specifically, the vector representations 258, 259 provide information regarding linear (e.g., push-pull) forces and torque forces, respectively. To illustrate when forces change, the arrows may increase in length, change color, increase in brightness, etc.

In addition to the screen 250, the control system may communicate to the operator using audible or tactile signals. For example, if one of the torque forces or linear forces approaches a predetermined limit, the audible signal may provide an alarm sound. As another example, the audible signal may be continuously provided throughout the grasping state. The audible signal may include a series of beeps that increase or decrease in frequency as the corresponding force moves toward or away from, respectively, the predetermined limit.

During the pulling state, the robotic arm may pull the target object (e.g., lever). During the pushing state, the robotic arm may push the target object. During the releasing state, the robotic arm may release and/or move away from the target object. Each of the pulling state, the pushing state, and the releasing state may present similar information to the operator with a user display as shown in FIG. 7 with respect to the grasping state. During the homing state, the control system may return to a home position. For example, the vehicle may move to a designated home or base area in the field. There may be a single home area or multiple home areas. Alternatively, the control system may simply "shut down" and await instructions for performing another task.

As described above, embodiments set forth herein may communicate a fused ensemble having a plurality of different communications to the operator. Although the fused ensemble may include a plurality of communications, the fused ensemble may include only a single type of communication. For example, the fused ensemble may include using a user display that presents information to the operator using visual signals regarding multiple state parameters. In particular embodiments, however, the fused ensemble includes different types of communications. For example, the fused ensemble may include communications from different units (e.g., user display, speaker) of the system interface. In certain embodiments, the fused ensemble is dynamic and may change based on environmental data such that a combination of communications changes during operation.

To this end, the controller 132 includes a decision-making engine or module 204, memory 206 for storing the environmental data, memory 208 for storing task-specific or general data (e.g., governmental requirements, industry standards, operator preferences, historical data regarding performance, etc.), and a fusion module 210. The controller 132 also includes a first-response module 212 and a reflex module 214. Also shown in FIG. 6, the control system 100 also includes a physical interface that is operably coupled to the controller 132. The physical interface includes the units 110, 112, 114, 118. Each of the units is a communication unit that is configured to convey one or more communications to the operator regarding one or more of the state parameters. The various elements of the control system 100 may collectively operate to provide the fused ensembles.

The decision-making engine 204 may use a rule-based algorithm to identify the state parameters that will be communicated to the operator. The identified state parameters may be based on the current state of the control system and, optionally, environmental data. For example, the robot state machine 202 may communicate to the decision-making engine 204 that the control system is in the pre-actuation state. Based on this information, the decision-making engine 204 may identify the state parameters that will be communicated to the operator. The decision-making engine 204 may also assign weighted factor (or weights) that should be applied to the state parameters. For example, the decision-engine may decide that the most important state parameter to communicate to the operator is a distance that must be traversed by the control system to position the control system for performing the task. Accordingly, the decision-making engine 204 may assign a weight that effectively increases the importance of the state parameter.

In some embodiments, the decision-making engine 204 may assign weighted factors (or weights) to the type of communication. For example, the decision-making engine 204 may determine that, due to the noise in the environment, the most effective manner in communicating with the operator is through the user display. At a later time, the decision-making engine 204 may determine that, due to the visibility in the environment, the most effective manner in communicating with the operator is through the audible signals.

The fusion module 210 receives environmental data, the identified state parameters, and the weights for the state parameters, and/or the weights for the types of communications. The fusion module 210 may analyze the environmental data and the state parameters to determine the fused ensemble. The fused ensemble may multiple communications for respective state parameters. For example, a first communication may be generated for a first state parameter, a second communication may be generated for a second state parameter, and a third communication may be generated for a third state parameter. The fused ensemble may determine the information in the communication and also the physical unit that will provide the communication (e.g., the user display of the computing device 112 or the audible-generating device 118). The fusion module 210 may using an artificial neural network (ANN).

Throughout the decision-making and determining operations, the first-response module 212 may supersede or override any fused ensemble generated by the fusion module 210. As one example, the first-response module 212 may be provided in response to detecting that a collision is approaching. As described above, the decision-making engine 202 may be rule-based. The first-response module 212 may be implemented using logical operations to automatically change the fused ensemble. In some cases, the first-response module 212 directly provides the fused ensemble. In other embodiments, the first-response module 212 may modify the weights provided by the decision-making engine 204.

To illustrate one example, during the pre-actuation state, the control system 100 may move to a location that is close to a grasping point on the lever. During this time, the decision-making engine 204 may receive the current state from the robot state machine 202. The decision-making engine 204 may determine that the interaction intent is to inform the operator that the control system is moving. As such, the decision-making engine 204 may identify the state parameters to communicate to the operator. The identified state parameters may be based on the environmental data. For instance, the decision-making engine 204 may decide that the fused ensemble is to inform the operator that (1) the control system is moving, (2) the speed of the control system is important, and (3) the distance between the control system and the target object (e.g., rail car) is related to safety of the operator and the control system. After communicating the state parameters within the fused ensemble and, optionally, weighted factors, the fusion module 210 may analyze the environmental data to determine whether to change fused ensemble. For example, if the environmental data indicates that the distance is less than a designated baseline, the fused ensemble may change to indicate that this state parameter (distance to the target object is most important).

Accordingly, the fusion module 210 may determine how to convey the communications to the operator. In the above example, the fusion module 210 may determine that the fused ensemble will include LED lights from the light-signaling device 110, an artificial human voice, a speaker with a beeping sound, and an animation of the motion of the robot on the user display. One state parameter may be the current state of the control system 100 and this state parameter may be communicated to the operator using one of the LED lights, a combination of the LED lights, and/or predetermined color(s) of the LED light(s). The current state of the control system 100 may also be communicated to the operator through an artificial human voice. Another state parameter, the speed of the control system, may be communicated by a flashing light of a light-signaling device 110. The faster the speed is, the higher the flashing frequency is. At the same time, the motion of the control system may be simulated on a user display of a computing device for the operator to observe. The color of the graphical representation of the control system on the user display may be determined by the distance between the control system and the target object. A frequency of the beeping sound may become greater as the distance becomes smaller.

During the grasping state, the decision-making engine 204 may determine that the interaction intent is to inform the operator about the different forces involved in grasping the lever and locations of the different points in which the lever is grasped. As described above with respect to FIG. 7, the forces/torques may be visually represented on a user display. The forces/torques may also be visually represented by flashing lights from the light-signaling device 110 and audible sounds from the audible-generating device 118. The sounds may be beeps having different frequencies based on the amount of force or amount of torque being applied.

Although the above description describes the decision-making engine 204 and the fusion module 210 as being separate modules, it should be understood that functions of one module may be performed by the other module and vice versa. It should also be understood that the functions of the decision-making engine 204 and the fusion module 210 may be performed by a single module or a plurality of other modules.

Figure 8:
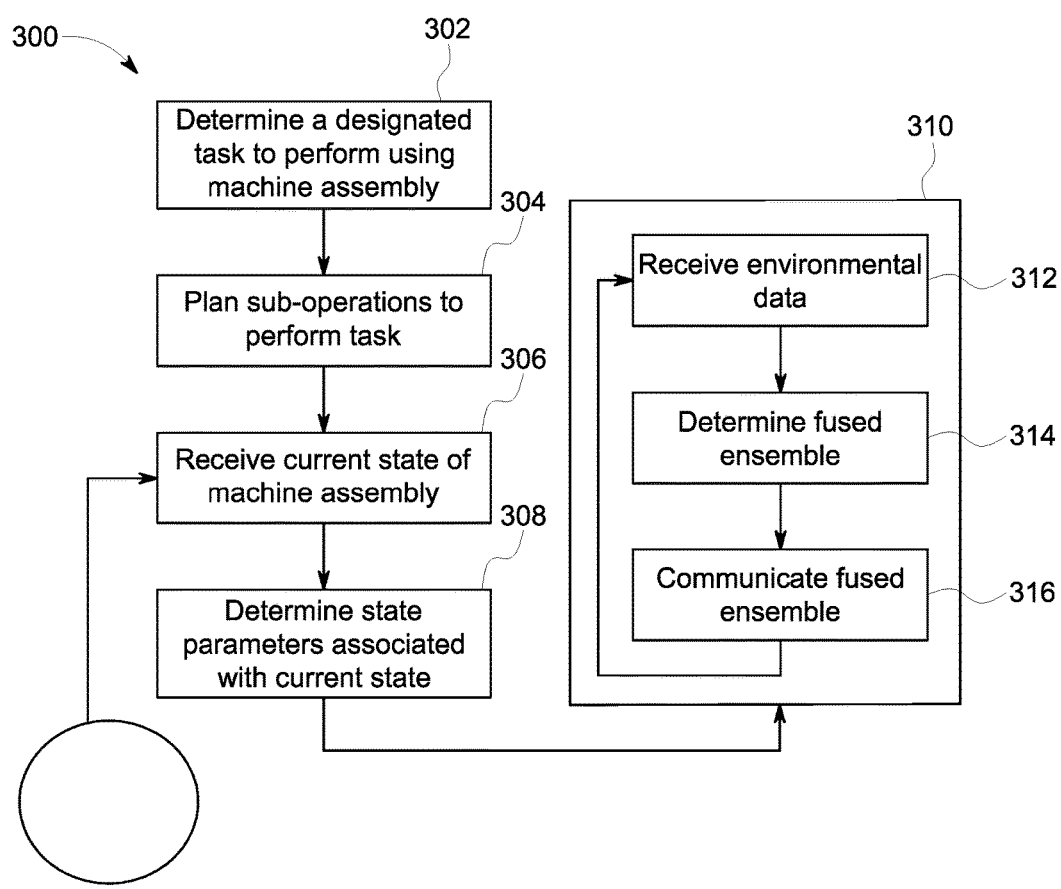
FIG. 8 is a flowchart illustrating a method in accordance with one embodiment.

FIG. 8 is a flowchart illustrating a method 300 of communicating information to an operator of a control system. The method 300, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

The method 300 includes determining, at 302, a designated task to perform using a machine assembly of a control system. The control system includes a system interface for communicating with an operator. The determining, at 302, may be accomplished by receiving instructions from a remote system (e.g., supervising system) or from a human operator. The instructions may be electronically communicated or in other manners (e.g., verbally communicated). In some cases, the determining, at 302, may include identifying, at the control system, a task to be performed. For example, the control system may determine that a newly arrived rail car requires brake-bleeding without any recent instructions or prompting from the operator.

After determining the task to be performed, at 302, the method 300 may include planning, at 304, a plurality of sub-operations to perform in order to accomplish the designated task. For instance, the control system may have stored information that indicates the various steps that must be performed to bleed the brakes. The stored information may include the operating states that the control system must have to accomplish the task. Based on these steps and/or operating states, the control system may plan the actions that the control system will perform to accomplish each step and/or each operating state. For example, with respect to the pre-actuation state, the control system may determine, at 304, that a series of actions must be performed in order to locate the robotic arm at the designated position with respect to the brake system.

At 306, a current operating state (or current state) of the machine assembly (or the control system) may be received. The current state may be received at the control system. The receiving, at 306, may occur while the machine assembly is performing the designated task or, more specifically, while the machine assembly is performing a sub-operation of the task. At 308, a plurality of state parameters associated with the current state may be determined. For example, the state parameters for the current state may be stored within the memory 208.

The method 300 may then perform a dynamic decision-making process 310. The process 310 may include, for example, receiving environmental data at 312. The environmental data may be received through one or more sensors, through other control systems, through the operator, and/or through a supervising system.

At 314, the decision-making process includes determining a fused ensemble based on the environmental data and the state parameters of the current state. The fused ensemble includes a respective communication from the system interface to the operator for each of the state parameters that necessitate a communication. More specifically, one or more operating states may not be associated with any state parameters that are communicated to the operator or may be associated with only one state parameter that is communicated to the operator. Each respective communication of the fused ensemble informs the operator about the corresponding state parameter. Each respective communication may include at least one of a visual signal, an audible signal, or a tactile signal from the system interface. At 316, the fused ensemble is communicated to the operator through the system interface.

The process 310 may be repeated a plurality of times. For example, the process 310 may be repeated continuously, in accordance with a predetermined schedule (e.g., every 10 seconds, 20 seconds, etc.), and/or when predetermined events occur. The predetermined events may include, for example, when the environmental data changes or when a state parameter changes. The process 310 may receive new environmental data and determine a new fused ensemble based on the new environmental data. The new fused ensemble may then be communicated to the operator. In some cases, determining the fused ensemble, at 314, includes re-prioritizing the state parameters based on the environmental data. As such, a plurality of different fused ensembles may be communicated to the operator during a single operating state.

In some embodiments, the fused ensemble changes by modifying a degree of at least one of the respective communications, replacing at least one of the respective communications with a different communication, or adding a respective communication to the fused ensemble that redundantly informs the operator about one of the state parameters. For example, the fused ensemble may change by at least one of: (1) changing a frequency at which a series of audible signals is communicated to the operator; (2) changing a volume of an audible signal; (3) replacing an audible signal with at least a visual signal; (4) replacing a visual signal with at least an audible signal; (5) changing an amount of illuminance from a light source; (6) changing a frequency at which a series of flashes is visually communicated to the operator; (7) changing a color of light that is visually communicated to the operator; or (8) communicating another type of signal to the operator in addition to the original signal for a state parameter.

At some point while performing the task, the control system may change operating states. Upon changing the operating state, the method 300 may return to the receiving, at 306, a new current state. The method 300 may determine the new state parameters, if any, and initiate the decision-making process 310 again. In some cases, a new fused ensemble may be generated.

In an embodiment, a method is provided that includes determining a designated task to perform using a machine assembly of a control system. The control system includes a system interface for communicating with an operator. The method also includes receiving a current state of the machine assembly while the designated task is being performed by the machine assembly. The current state is associated with a plurality of pre-defined state parameters. The method also includes executing a dynamic decision-making process. The dynamic decision-making process includes (a) receiving environmental data and (b) determining a fused ensemble based on the environmental data and the state parameters of the current state. The fused ensemble includes communications from the system interface to the operator for the state parameters. The communications are configured to inform the operator about the state parameters and includes at least one of a visual signal, an audible signal, or a tactile signal from the system interface. The dynamic decision-making process also includes (c) communicating the fused ensemble to the operator through the system interface and (d) repeating (a)-(c) while the machine assembly is in the current state. The fused ensemble is configured to change based on changes in the environmental data.

In one aspect, the fused ensemble changes by modifying a degree of at least one of the communications, replacing at least one of the communications with a different communication, or adding a communication to the fused ensemble that redundantly informs the operator about one of the state parameters.

In another aspect, the fused ensemble changes by at least one of: (1) changing a frequency at which a series of audible signals is communicated to the operator; (2) changing a volume of an audible signal; (3) replacing an audible signal with at least a visual signal; (4) replacing a visual signal with at least an audible signal; (5) changing an amount of illuminance from a light source; (6) changing a frequency at which a series of flashes is visually communicated to the operator; (7) changing a color of light that is visually communicated to the operator; or (8) communicating another type of signal to the operator in addition to the original signal for a state parameter.

In another aspect, the step of determining the fused ensemble includes re-prioritizing the state parameters based on the environmental data.

In another aspect, at least some of the state parameters are assigned weights that are based on the environmental data. The state parameters are assigned new weights when the environmental data changes, wherein a subsequent determining the fused ensemble is based on the new weights.

In another aspect, determining the fused ensemble may be superseded by a pre-defined urgent interaction based on the environmental data. Optionally, the pre-defined urgent interaction includes warning the operator of possible danger to the operator or the machine assembly. Optionally, the machine assembly automatically pauses or aborts the designated task in response to the pre-defined urgent interaction.

In another aspect, the system interface includes at least two of a user display, a light source, or an audio-generating instrument.

In another aspect, the method also includes, after determining the designated task, planning a plurality of sub-operations to perform the designated task, wherein the machine assembly is in the current state for at least one of the sub-operations.

In another aspect, the method includes receiving a new current state of the machine assembly and repeating the dynamic decision-making process with the new current state. The new current state has a different grouping of state parameters.

In another aspect, the method is performed in a rail yard.

In another aspect, the designated task is a brake-bleeding task.

In another aspect, at least one of the state parameters is communicated to the operator with multiple different communications.

In one embodiment, a system is provided that includes a machine assembly and a control system configured to control the machine assembly to perform a designated task. The control system includes a system interface for communicating with an operator. The control system includes one or more processors that are configured to receive a current state of the machine assembly while the designated task is being performed by the machine assembly. The current state is associated with a plurality of pre-defined state parameters. The one or more processors are also configured to execute a dynamic decision-making process that includes (a) receiving environmental data and (b) determining a fused ensemble based on the environmental data and the state parameters of the current state. The fused ensemble includes communications from the system interface to the operator for the state parameters. The communications are configured to inform the operator about the state parameters and includes at least one of a visual signal, an audible signal, or a tactile signal from the system interface. The dynamic decision-making process also includes (c) communicating the fused ensemble to the operator through the system interface and (d) repeating (a)-(c) while the machine assembly is in the current state. The fused ensemble is configured to change based on changes in the environmental data.

In one aspect, the fused ensemble is changed by modifying a degree of at least one of the communications, replacing at least one of the communications with a different communication, or adding a communication to the fused ensemble that redundantly informs the operator about one of the state parameters.

In another aspect, the fused ensemble changes by at least one of: (1) changing a frequency at which a series of audible signals is communicated to the operator; (2) changing a volume of an audible signal; (3) replacing an audible signal with at least a visual signal; (4) replacing a visual signal with at least an audible signal; (5) changing an amount of illuminance from a light source; (6) changing a frequency at which a series of flashes is visually communicated to the operator; (7) changing a color of light that is visually communicated to the operator; or (8) communicating another type of signal to the operator in addition to the original signal for a state parameter.

In another aspect, determining the fused ensemble includes re-prioritizing the state parameters based on the environmental data.

In another aspect, at least some of the state parameters are assigned weights that are based on the environmental data, the state parameters being assigned new weights when the environmental data changes, wherein a subsequent determining the fused ensemble is based on the new weights.

In another aspect, determining the fused ensemble may be superseded by a pre-defined urgent interaction based on the environmental data. Optionally, the pre-defined urgent interaction includes warning the operator of possible danger to the operator or the machine assembly. Optionally, the machine assembly automatically pauses or aborts the designated task in response to the pre-defined urgent interaction.

In another aspect, the system interface includes at least two of a user display, a light source, or an audio-generating instrument.

In another aspect, the one or more processors are also configured to plan a plurality of sub-operations to perform the designated task. The machine assembly is in the current state for at least one of the sub-operations.

In another aspect, the one or more processors are also configured to receive a new current state of the machine assembly and repeat the dynamic decision-making process with the new current state. The new current state has a different grouping of state parameters.

In another aspect, the designated task is a brake-bleeding task.

In another aspect, at least one of the state parameters is communicated to the operator with multiple different communications.

In one embodiment, a method is provided that includes determining a designated task to perform using a machine assembly of a control system. The control system includes a system interface for communicating with an operator. The method also includes receiving a current state of the machine assembly while the designated task is being performed by the machine assembly. The current state is associated with a plurality of pre-defined state parameters. The method also includes determining a fused ensemble based on the environmental data and the state parameters of the current state. The fused ensemble includes communications from the system interface to the operator for the state parameters. The communications inform the operator about the state parameters and includes at least one of a visual signal, an audible signal, or a tactile signal from the system interface. The fused ensemble includes at least two types of signals.

In one embodiment, a system is provided that includes a machine assembly and a control system configured to control the machine assembly to perform a designated task. The control system includes a system interface for communicating with an operator. The control system includes one or more processors that are configured to receive a current state of the machine assembly while the designated task is being performed by the machine assembly. The current state is associated with a plurality of pre-defined state parameters. The one or more processors are also configured to determine a fused ensemble based on the environmental data and the state parameters of the current state. The fused ensemble includes communications from the system interface to the operator for the state parameters. The communications inform the operator about the state parameters and includes at least one of a visual signal, an audible signal, or a tactile signal from the system interface. The fused ensemble includes at least two types of signals.

In some embodiments, the inventive subject matter set forth herein provides a method of developing a dynamic environment-aware interface between robots and human operators. As stated earlier, conventional interfaces between robots and humans may be static. Embodiments set forth herein may bridge interaction intent (e.g., what information to communicate to the operator) and visualization content (e.g., how the information is communicated to the operator). Dynamic environmental information is taken into the information processing to enable control systems, such as autonomous robotic systems, to provide robust and reliable interaction with human operators.

It should be noted that the particular arrangement of elements (e.g., the number, types, placement, or the like) of the illustrated embodiments may be modified in various alternate embodiments. For example, in various embodiments, different numbers of a given device, unit, or module may be employed. In various embodiments, a different type or types of a given device, unit, or module may be employed. In various embodiments, a number of devices, units, or modules (or aspects thereof) may be combined. In various embodiments, a given device, unit, or module may be divided into plural devices (or sub-devices) or plural units (or sub-units) or plural modules (or sub-modules). In various embodiments, one or more aspects of one or more devices, units, or modules may be shared between devices, units, or modules. In various embodiments, a given device, unit, or module may be added or a given device, unit, or module may be omitted.

As used herein, a processor or a processing unit includes processing circuitry configured to perform one or more tasks, functions, or steps, such as those described herein. For instance, the processor may be a logic-based device that performs operations based on instructions stored on a tangible and non-transitory computer readable medium, such as memory. It may be noted that a "processor," as used herein, is not intended to necessarily be limited to a single processor or single logic-based device. For example, the processor may include a single processor (e.g., having one or more cores), multiple discrete processors, one or more application specific integrated circuits (ASICs), and/or one or more field programmable gate arrays (FPGAs). In some embodiments, the processor is an off-the-shelf device that is appropriately programmed or instructed to perform operations, such as the algorithms described herein.

The processor may also be a hard-wired device (e.g., electronic circuitry) that performs the operations based on hard-wired logic that is configured to perform the algorithms described herein. Accordingly, the processor may include one or more ASICs and/or FPGAs. Alternatively or in addition to the above, the processor may include or may be associated with a tangible and non-transitory memory having stored thereon instructions configured to direct the processor to perform the algorithms described herein.

It is noted that operations performed by the processor (e.g., operations corresponding to the methods/algorithms described herein, or aspects thereof) may be sufficiently complex that the operations may not be performed by a human being within a reasonable time period based on the intended application of the assay system. The processor may be configured to receive signals from the various subsystems and devices of the system or user inputs from the user. The processor may be configured to perform the methods described herein.

Processors may include or be communicatively coupled to memory. In some embodiments, the memory may include non-volatile memory. For example, the memory may be or include read-only memory (ROM), random-access memory (RAM), electrically erasable programmable read-only memory (EEPROM), flash memory, and the like. The memory may be configured to store data regarding operating parameters of the system 400.

In an exemplary embodiment, the processor executes a set of instructions that are stored in one or more storage elements, memories, and the like. Embodiments include non-transitory computer-readable media that include set of instructions for performing or executing one or more processes set forth herein. Non-transitory computer readable media may include all computer-readable media, except for transitory propagating signals per se. The non-transitory computer readable media may include generally any tangible computer-readable medium including, for example, persistent memory such as magnetic and/or optical disks, ROM, and PROM and volatile memory such as RAM. The computer-readable medium may store instructions for execution by one or more processors.

The set of instructions may include various commands that instruct the system to perform specific operations such as the methods and processes of the various embodiments described herein. The set of instructions may be in the form of a software program. As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to those of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §130(f), unless and until such claim limitations expressly use the phrase "means for" followed by a statement of function void of further structure.

This written description uses examples to disclose several embodiments of the inventive subject matter and also to enable any person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods for communicating with an operator, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

The following claims recite embodiments of the present application and are hereby incorporated into the detail description.

What is claimed is:

1. A method comprising:

determining a designated task to perform using a machine assembly of a control system, the control system including a system interface for communicating with an operator, receiving a current state of the machine assembly while the designated task is being performed by the machine assembly, the current state being associated with plural pre-defined state parameters;

executing a dynamic decision-making process comprising:
- (a) receiving environmental data;
- (b) determining a fused ensemble based on the environmental data and the state parameters of the current state, the fused ensemble including communications for the state parameters from the system interface to the operator, the communications informing the operator about the state parameters and including at least one of a visual signal, an audible signal, or a tactile signal from the system interface;
- (c) communicating the fused ensemble to the operator through the system interface;
- (d) repeating (a)-(c) while the machine assembly is in the current state, the fused ensemble configured to change based on changes in the environmental data.

2. The method of claim 1, wherein the fused ensemble changes by modifying a degree of at least one of the communications, replacing at least one of the communications with a different communication, or adding a communication to the fused ensemble that redundantly informs the operator about one of the state parameters.

3. The method of claim 1, wherein the fused ensemble changes by at least one of: (1) changing a frequency at which a series of audible signals is communicated to the operator; (2) changing a volume of an audible signal; (3) replacing an audible signal with at least a visual signal; (4) replacing a visual signal with at least an audible signal; (5) changing an amount of illuminance from a light source; (6) changing a frequency at which a series of flashes is visually communicated to the operator; (7) changing a color of light that is visually communicated to the operator; or (8) communicating another type of signal to the operator in addition to the original signal for a state parameter.

4. The method of claim 1, wherein determining the fused ensemble includes re-prioritizing the state parameters based on the environmental data.

5. The method of claim 1, wherein at least some of the state parameters are assigned weights that are based on the environmental data, the state parameters being assigned new weights when the environmental data changes, wherein a subsequent determining the fused ensemble is based on the new weights.

6. The method of claim 1, wherein determining the fused ensemble may be superseded by a pre-defined urgent interaction based on the environmental data.

7. The method of claim 6, wherein the pre-defined urgent interaction includes warning the operator of possible danger to the operator or the machine assembly.

8. The method of claim 6, wherein the machine assembly automatically pauses or aborts the designated task in response to the pre-defined urgent interaction.

9. The method of claim 1, wherein the system interface includes at least two of a user display, a light source, or an audio-generating instrument.

10. The method of claim 1, further comprising, after determining the designated task, planning plural sub-operations to perform the designated task, wherein the machine assembly is in the current state for at least one of the sub-operations.

11. The method of claim 1, further comprising receiving a new current state of the machine assembly and repeating the dynamic decision-making process with the new current state, the new current state having a different grouping of state parameters.

12. The method of claim 1, wherein the method is performed in a rail yard.

13. The method of claim 1, wherein the designated task is a brake-bleeding task.

14. The method of claim 1, wherein at least one of the state parameters is communicated to the operator with multiple different communications.

15. A system comprising:

a machine assembly;

a control system configured to control the machine assembly to perform a designated task, the control system including a system interface for communicating with an operator, wherein the control system includes one or more processors that are configured to:

receive a current state of the machine assembly while the designated task is being performed by the machine assembly, the current state being associated with plural pre-defined state parameters;

execute a dynamic decision-making process comprising:
- (a) receiving environmental data;
- (b) determining a fused ensemble based on the environmental data and the state parameters of the current state, the fused ensemble including communications for the state parameters from the system interface to the operator, the communications informing the operator about the state parameters and including at least one of a visual signal, an audible signal, or a tactile signal from the system interface;
- (c) communicating the fused ensemble to the operator through the system interface;
- (d) repeating (a)-(c) while the machine assembly is in the current state, the fused ensemble configured to change based on changes in the environmental data.

16. The system of claim 15, wherein the fused ensemble is changed by modifying a degree of at least one of the communications, replacing at least one of the communications with a different communication, or adding a communication to the fused ensemble that redundantly informs the operator about one of the state parameters.

17. The system of claim 15, wherein the fused ensemble changes by at least one of: (1) changing a frequency at which a series of audible signals is communicated to the operator; (2) changing a volume of an audible signal; (3) replacing an audible signal with at least a visual signal; (4) replacing a visual signal with at least an audible signal; (5) changing an amount of illuminance from a light source; (6) changing a frequency at which a series of flashes is visually communicated to the operator; (7) changing a color of light that is visually communicated to the operator; or (8) communicating another type of signal to the operator in addition to the original signal for a state parameter.

18. The system of claim 15, wherein determining the fused ensemble includes re-prioritizing the state parameters based on the environmental data.

19. The system of claim 15, wherein at least some of the state parameters are assigned weights that are based on the environmental data, the state parameters being assigned new weights when the environmental data changes, wherein a subsequent determining the fused ensemble is based on the new weights.

* * * * *